(12) United States Patent
Shin et al.

(10) Patent No.: US 11,850,909 B2
(45) Date of Patent: Dec. 26, 2023

(54) AIR CONDITIONER APPARATUS FOR ELECTRIC VEHICLES AND AIR CONDITIONING SYSTEM FOR ELECTRIC VEHICLES USING THE SAME

(71) Applicants: HYUNDAI MOTOR COMPANY, Seoul (KR); KIA CORPORATION, Seoul (KR)

(72) Inventors: Gee Young Shin, Suwon-si (KR); Seung Sik Han, Hwaseong-si (KR); Dong Ho Kwon, Yongin-si (KR); Myung Hoe Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 303 days.

(21) Appl. No.: 17/241,979

(22) Filed: Apr. 27, 2021

(65) Prior Publication Data
US 2022/0126647 A1    Apr. 28, 2022

(30) Foreign Application Priority Data

Oct. 28, 2020    (KR) .................... 10-2020-0141270

(51) Int. Cl.
*B60H 1/00*    (2006.01)
*B60H 1/32*    (2006.01)

(52) U.S. Cl.
CPC ..... *B60H 1/00392* (2013.01); *B60H 1/00064* (2013.01); *B60H 1/00207* (2013.01);
(Continued)

(58) Field of Classification Search
CPC ........... B60H 2001/00175; B60H 2001/00221; B60H 2001/00135; B60H 2001/00092;
(Continued)

(56) References Cited

U.S. PATENT DOCUMENTS 5,669,813 A * 9/1997 Jairazbhoy ......... B60H 1/00271
361/645
7,152,417 B2 * 12/2006 Morishita ............... B60L 58/26
62/186
(Continued)

FOREIGN PATENT DOCUMENTS

CN    107531125 A  *  1/2018  ......... B60H 1/00028
CN    111591100 A  *  8/2020
(Continued)

OTHER PUBLICATIONS

WO-2016170862-A1 (Year: 2016).*
WO-2019010171-A1 (Year: 2019).*

*Primary Examiner* — Jenna M Hopkins
(74) *Attorney, Agent, or Firm* — LEMPIA SUMMERFIELD KATZ LLC

(57) ABSTRACT

An air conditioner apparatus for electric vehicles includes: an air conditioning case installed under an under body of a vehicle, and configured to communicate with an interior of the vehicle through an outlet formed through an upper portion of the air conditioning case and circulate conditioned air therein; an HVAC module provided inside the air conditioning case, and configured to adjust temperatures of indoor air and outdoor air and to provide the conditioned air to the interior of the vehicle; and a heat exchange module provided below the HVAC module inside the air conditioning case and configured to exchange heat with the HVAC module depending on whether or not the HVAC module performs a heating or cooling operation.

18 Claims, 10 Drawing Sheets

(52) U.S. Cl.
CPC ..... *B60H 1/00271* (2013.01); *B60H 1/32331* (2019.05); *B60H 2001/003* (2013.01); *B60H 2001/00092* (2013.01); *B60H 2001/00121* (2013.01); *B60H 2001/00128* (2013.01); *B60H 2001/00178* (2013.01)

(58) Field of Classification Search
CPC .......... B60H 2001/00178; B60H 2001/00614; B60H 1/00392; B60H 2001/003; B60H 1/00278; B60H 1/00271; B60H 1/00885; B60H 1/143; B60H 1/32281; B60H 1/32284; B60H 1/00385; B60H 1/004; B60H 1/00028; B60H 1/00021; B60H 1/00007
See application file for complete search history.

(56) References Cited

U.S. PATENT DOCUMENTS

| | | | | |
|---|---|---|---|---|
| 7,997,966 | B2 * | 8/2011 | Yoda | B60K 1/04 454/339 |
| 2004/0163398 | A1 * | 8/2004 | Morishita | H01M 10/633 62/186 |
| 2005/0056035 | A1 * | 3/2005 | Smith | B60H 1/3214 62/133 |
| 2009/0071178 | A1 * | 3/2009 | Major | B60L 58/27 62/239 |
| 2011/0005255 | A1 * | 1/2011 | Tanihata | B60H 1/00785 165/59 |
| 2011/0016896 | A1 * | 1/2011 | Oomura | B60H 1/321 392/347 |
| 2011/0165830 | A1 * | 7/2011 | Smith | B60H 1/00278 454/75 |
| 2011/0269387 | A1 * | 11/2011 | Leffert | B60L 58/18 454/75 |
| 2012/0003910 | A1 * | 1/2012 | Richter | B60H 1/00385 454/141 |
| 2012/0247747 | A1 * | 10/2012 | DiGasbarro | B60H 1/00028 165/122 |
| 2014/0293538 | A1 * | 10/2014 | Han | H02J 50/90 361/690 |
| 2016/0161154 | A1 * | 6/2016 | Park | B60H 1/00021 62/160 |
| 2017/0087956 | A1 * | 3/2017 | Graaf | B60H 1/00921 |
| 2017/0341482 | A1 * | 11/2017 | Takezawa | H01M 10/613 |
| 2018/0272830 | A1 * | 9/2018 | Vespa | B60H 1/32281 |
| 2019/0092118 | A1 * | 3/2019 | Lee | B60L 1/003 |
| 2019/0145675 | A1 * | 5/2019 | Kim | B60H 1/00885 62/324.6 |
| 2019/0176565 | A1 * | 6/2019 | Shin | B60H 1/00835 |
| 2019/0263223 | A1 * | 8/2019 | Durrani | B60H 1/00921 |
| 2019/0366800 | A1 * | 12/2019 | Durrani | B60H 1/00485 |
| 2020/0274210 | A1 * | 8/2020 | Bae | H01M 10/486 |
| 2021/0070132 | A1 * | 3/2021 | Kwon | B60H 1/00742 |
| 2021/0323374 | A1 * | 10/2021 | Shin | B60H 1/00057 |
| 2021/0323375 | A1 * | 10/2021 | Kim | B60H 1/3228 |
| 2021/0379958 | A1 * | 12/2021 | Hsiao | G06F 1/182 |

FOREIGN PATENT DOCUMENTS

| | | | | |
|---|---|---|---|---|
| CN | 112449554 A | * | 3/2021 | ......... B60H 1/00271 |
| DE | 102009050994 A1 | * | 4/2011 | ......... B60H 1/00278 |
| DE | 102010026101 A1 | * | 1/2012 | ......... B60H 1/00028 |
| DE | 102010030892 A1 | * | 1/2012 | ......... B60H 1/00278 |
| DE | 102015207647 A1 | * | 6/2016 | ......... B60H 1/00021 |
| DE | 102009028522 B4 | * | 5/2017 | ......... B60H 1/00021 |
| DE | 112016001898 T5 | * | 1/2018 | ......... B60H 1/00028 |
| DE | 102017223146 A1 | * | 6/2019 | |
| DE | 102018211559 A1 | * | 1/2020 | ......... B60H 1/00278 |
| DE | 102020116502 A1 | * | 12/2020 | ......... B60H 1/00028 |
| DE | 102020211054 A1 | * | 6/2021 | ......... B60H 1/00021 |
| EP | 2075873 A1 | * | 7/2009 | ......... B60H 1/00278 |
| FR | 2914587 A1 | * | 10/2008 | ......... B60H 1/00021 |
| FR | 2949096 A3 | * | 2/2011 | ......... B60H 1/00278 |
| FR | 3057494 A1 | * | 4/2018 | ......... B60H 1/00492 |
| JP | 2011-017474 | | 1/2011 | |
| JP | 5287578 B2 | * | 9/2013 | ......... B60H 1/00785 |
| JP | 2018150033 A | * | 9/2018 | ............... B60H 1/00 |
| KR | 10-2008-0092527 | | 10/2008 | |
| KR | 10-2012-0140101 | | 12/2012 | |
| KR | 10-2020-0025794 | | 3/2020 | |
| WO | WO-2007105430 A2 | * | 9/2007 | ......... B60H 1/00278 |
| WO | WO-2013145701 A1 | * | 10/2013 | ......... B60H 1/00035 |
| WO | WO-2016063567 A1 | * | 4/2016 | ......... B60H 1/00028 |
| WO | WO-2018069629 A1 | * | 4/2018 | ......... B60H 1/00492 |
| WO | WO-2019132481 A1 | * | 7/2019 | ............... B60H 1/00 |
| WO | WO-2020045878 A1 | * | 3/2020 | ......... B60H 1/00028 |
| WO | WO-2020130518 A1 | * | 6/2020 | ......... B60H 1/00278 |
| WO | WO-2020184869 A1 | * | 9/2020 | ......... B60H 1/00207 |
| WO | WO-2021015483 A1 | * | 1/2021 | ......... B60H 1/00278 |
| WO | WO-2021059529 A1 | | 4/2021 | |
| WO | WO-2021177788 A1 | * | 9/2021 | ......... B60H 1/00028 |
| WO | WO-2021177790 A1 | * | 9/2021 | ......... B60H 1/00021 |

* cited by examiner

AIR CONDITIONER APPARATUS FOR ELECTRIC VEHICLES AND AIR CONDITIONING SYSTEM FOR ELECTRIC VEHICLES USING THE SAME

CROSS-REFERENCE TO RELATED APPLICATION

This application claims priority to and the benefit of Korean Patent Application No. 10-2020-0141270, filed on Oct. 28, 2020, the entire contents of which are incorporated herein by reference.

FIELD

The present disclosure relates to an air conditioner apparatus for electric vehicles.

BACKGROUND

The statements in this section merely provide background information related to the present disclosure and may not constitute prior art.

Electric vehicles are emerging recently as a social issue in order to implement environmentally friendly technology and to reduce energy exhaustion. Electric vehicles are operated using a motor, which receives electricity supplied from a battery and outputs power. Therefore, electric vehicles have advantages, such as no carbon dioxide emission, low noise and the energy efficiency of a motor, which is higher than the energy efficiency of an engine, and thus, are spotlighted as eco-friendly vehicles.

In implementation of these electric vehicles, technology related to battery modules is used as core technology, and research on weight reduction, miniaturization and rapid charging of batteries is being actively conducted now. Battery modules is desired to be used under the optimal temperature environment in order to maintain the optimal performance and long lifespan thereof. However, it is difficult to use the battery modules under the optimal temperature environment because of heat generated during driving and an external temperature change.

Further, an electric vehicle does not have a waste heat source generated from a separate engine during combustion as in an internal combustion engine and thus performs heating of the interior thereof using an electric heating device. In addition, the electric vehicle uses a separate cooling water heating-type electric heater to warm-up and improve the charging and discharging performance of a battery in cold weather. That is, technology, in which a heating and cooling system for adjusting the temperature of a battery module so as to maintain the optimal temperature environment of the battery module is operated separately from a heating and cooling system for conditioning air in the interior of the vehicle, is used.

Here, an air conditioning system for conditioning air in the interior of the vehicle employs heat pump technology for reducing heating energy consumption so as to increase the mileage of the vehicle, and thus, reduces energy consumption. However, we have discovered that the air conditioning system, if separately provided outside the vehicle, requires connection of a separate duct, elongates refrigerant lines, and thus increases an amount of desired refrigerant.

The above information disclosed in the Background section is only for enhancement of understanding of the background of the disclosure and should not be interpreted as conventional technology that is already known to those skilled in the art.

SUMMARY

The present disclosure provides an air conditioner apparatus for electric vehicles, which integrates cooling areas of a heat, ventilation, and conditioning (HVAC) system and an air conditioning system so as to shorten refrigerant flow paths, and provides cooling and heating performance, and an air conditioning system for electric vehicles using the same.

In one form of the present disclosure, an air conditioner apparatus for electric vehicles includes: an air conditioning case installed under an under body of a vehicle and configured to communicate with an interior of the vehicle through an outlet formed through an upper portion of the air conditioning case so that conditioned air is circulated therein; an HVAC module provided inside the air conditioning case and configured to adjust temperatures of indoor air and outdoor air so as to provide the conditioned air to the interior of the vehicle, and a heat exchange module provided below the HVAC module inside the air conditioning case and configured to exchange heat with the HVAC module depending on whether or not the HVAC module performs a heating or cooling operation.

The air conditioning case may be divided into a first region configured such that the indoor air and the outdoor air are circulated thereinto, a second region configured to receive the indoor air and the outdoor air supplied from the first region, connected to the interior of the vehicle and provided with the HVAC module therein, and a third region configured such that air circulated through electronic components and the outdoor air are circulated thereinto and provided with the heat exchange module therein.

A first blower configured to simultaneously blow air to both the first region and the third region may be provided in the air conditioning case, the HVAC module may include an air conditioner provided in the first region so as to adjust circulation amounts of the indoor air and the outdoor air, and an evaporator and a heater provided in the second region, and the heat exchange module may include an indoor heat exchanger configured to share a refrigerant circulated in the evaporator.

When cooled air is provided to the interior of the vehicle, the indoor air may flow into the first region through the air conditioner, the indoor air may be cooled by the evaporator in the second region, and the outdoor air may be transmitted to the indoor heat exchanger in the third region by the first blower.

When heated air is provided to the interior of the vehicle, the indoor air and the outdoor air may flow into the first region through the air conditioner, the indoor air and the outdoor air may be heated by the heater in the second region, and the outdoor air and the air circulated through the electronic components may be transmitted to the indoor heat exchanger in the third region by the first blower.

The first region and the second region may be disposed laterally so as to be divided from each other, and the third region may be disposed under the second region so as to be divided therefrom.

An indoor air inlet configured to allow the indoor air to flow into the first region and a first outdoor air inlet configured to allow the outdoor air to flow into the first region may be formed in the first region of the air conditioning case, and the air conditioner may include a first adjustment door configured to adjust the circulation amounts of the indoor air and the outdoor air and a second blower configured to circulate the indoor air and the outdoor air, having passed through the first adjustment door, into the second region.

The evaporator and the heater may be disposed in a circulation direction of air, and an electric heater may be further provided behind the heater in the second region.

The second region may be divided into a first circulation path configured to allow air transmitted from the first region to bypass the heater and the electric heater, and a second circulation path configured to allow the air transmitted from the first region to pass through the heater and the electric heater.

A second adjustment door configured to adjust opening or closing of the first circulation path may be provided in the second region.

A third adjustment door configured to adjust opening or closing of the second circulation path may be provided in the second region.

A powertrain electronics (PE) room inlet configured to allow the air circulated through the electronic components to flow into the third region and a second outdoor air inlet configured to allow the outdoor air to flow into the third region may be formed in the third region of the air conditioning case, and a fourth adjustment door configured to adjust opening degrees of the PE room inlet and the second outdoor air inlet may be provided in the third region.

An opening configured to allow the second region and the third region to communicate with each other so as to circulate air from the second region into the third region may be formed through the air conditioning case, and a fifth adjustment door configured to adjust opening or closing of the opening may be provided at the opening.

A guide path configured to collect condensed water generated by the evaporator and to supply the condensed water to the indoor heat exchanger may be provided in the air conditioning case.

The first region and the second region may be disposed laterally so as to be divided from each other, and the third region may be disposed in front of or behind the second region so as to be divided therefrom.

In another form of the present disclosure, an air conditioning system for electric vehicles using the air conditioner apparatus for electric vehicles includes: a refrigerant line configured to circulate a refrigerant therealong and to have a compressor, an indoor heat exchanger of the heat exchange module, expansion units and an evaporator of the HVAC module provided thereon, a heating line configured to circulate cooling water therealong and to have a first water pump and a heater of the HVAC module provided thereon, an electronic component line configured to circulate the cooling water therealong and to have a second water pump, an outdoor heat exchanger and a powertrain electronics (PE) module provided thereon, a battery line configured to circulate the cooling water therealong and to have a third water pump and a battery module provided thereon, a first heat exchanger connected to the refrigerant line and the heating line so as to exchange heat between the refrigerant in the refrigerant line and the cooling water in the heating line, and a second heat exchanger connected to the electronic component line and the battery line so as to exchange heat between the cooling water in the electronic component line and the cooling water in the battery line.

The refrigerant line may include a first refrigerant line configured to start from the compressor and to be connected to the indoor heat exchanger via the first heat exchanger and a first expansion unit, a second refrigerant line configured to start from the indoor heat exchanger and to be connected to the compressor via a second expansion unit and the second heat exchanger, and a third refrigerant line configured to branch off from the second refrigerant line and to be connected to the compressor via a third expansion unit and the evaporator.

The heating line and the electronic component line may be connected by a first multi-way valve, and the electronic component line and the battery line may be connected by a second multi-way valve.

The electronic component line may include a first electronic component line configured to start from the first multi-way valve and to return to the first multi-way valve via the outdoor heat exchanger, the second water pump and the PE module, and a second electronic component line configured to branch off from the first electronic component line and to return to the first electronic component line via the second heat exchanger, and a third multi-way valve may be provided at a point at which the second electronic component line branches off from the first electronic component line.

A bypass line may branch off from the heating line in front of the heater, and a fourth multi-way valve may be provided on the bypass line.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
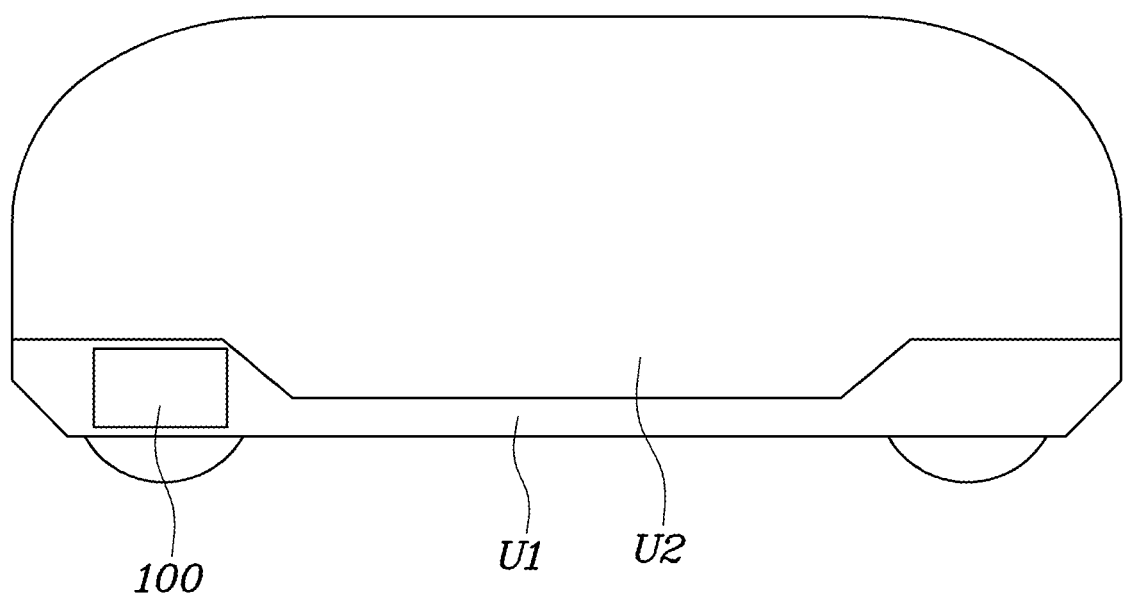
FIG. 1 is a view illustrating application of an air conditioning case to an electric vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein, the term "PE" stands for "Powertrain Electronics".

Hereinafter, an air conditioner apparatus for electric vehicles and an air conditioning system for electric vehicles using the same according to exemplary forms of the present disclosure will be described with reference to the accompanying drawings.

Figure 2:
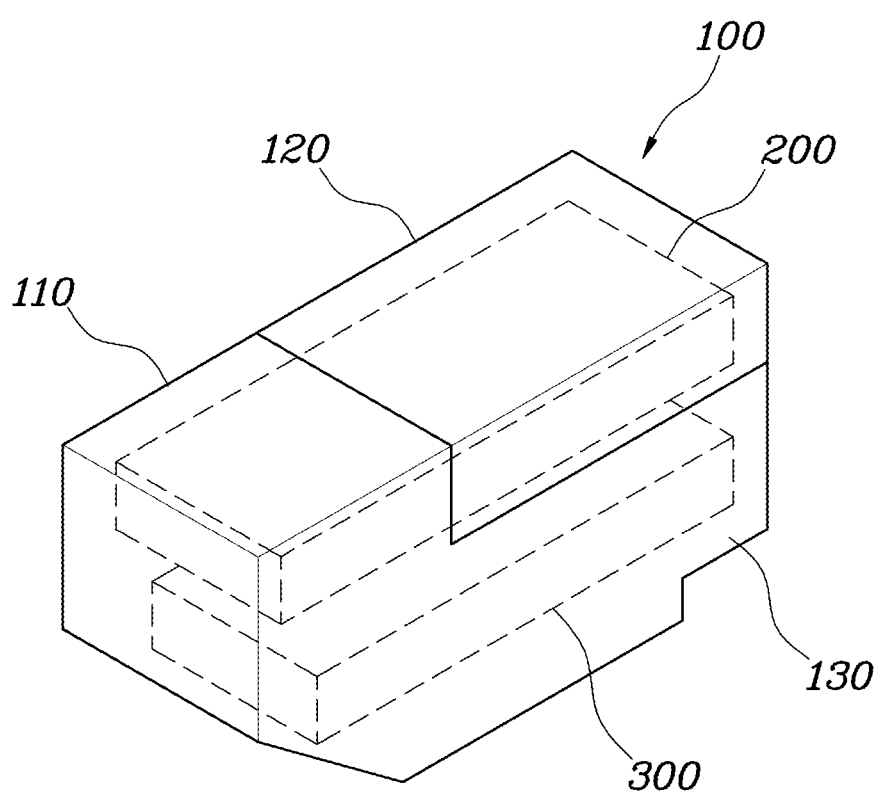
FIG. 2 is a view illustrating an air conditioning case of an air conditioner apparatus for electric vehicles according to one form of the present disclosure.
Figure 3:
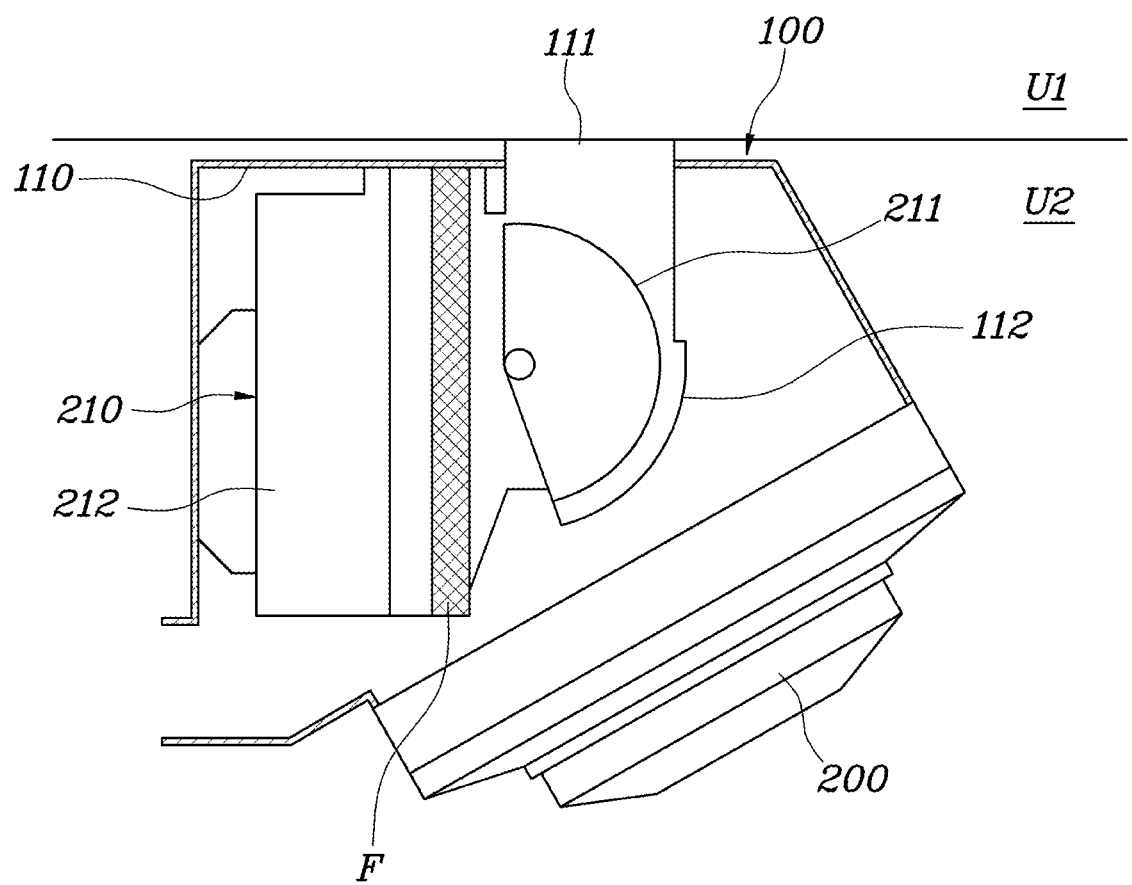
FIG. 3 is a view illustrating a first region of the air conditioner apparatus for electric vehicles according to the present disclosure, shown in FIG. 2.
Figure 4:
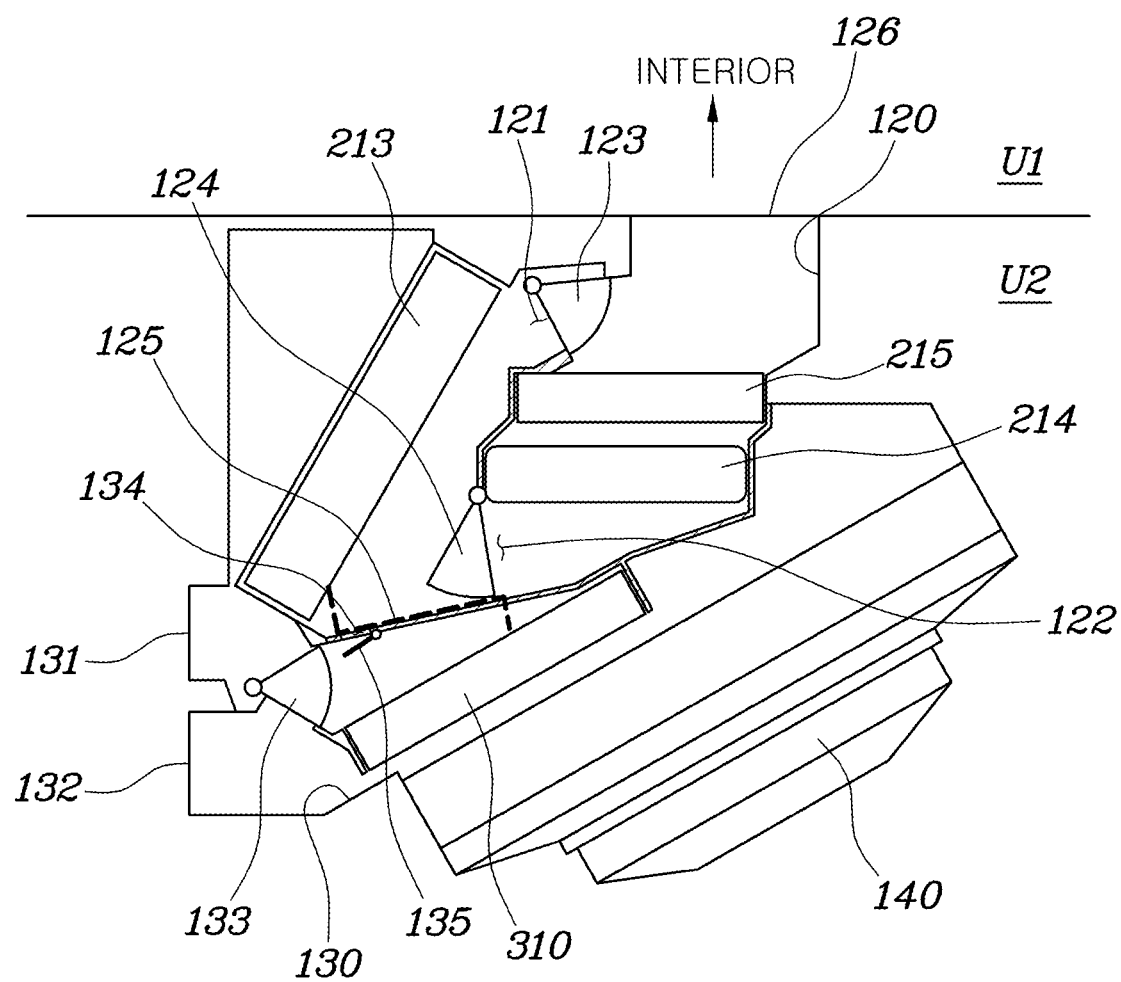
FIG. 4 is a view illustrating a second region and a third region of the air conditioner apparatus for electric vehicles according to the present disclosure, shown in FIG. 2.
Figure 5:
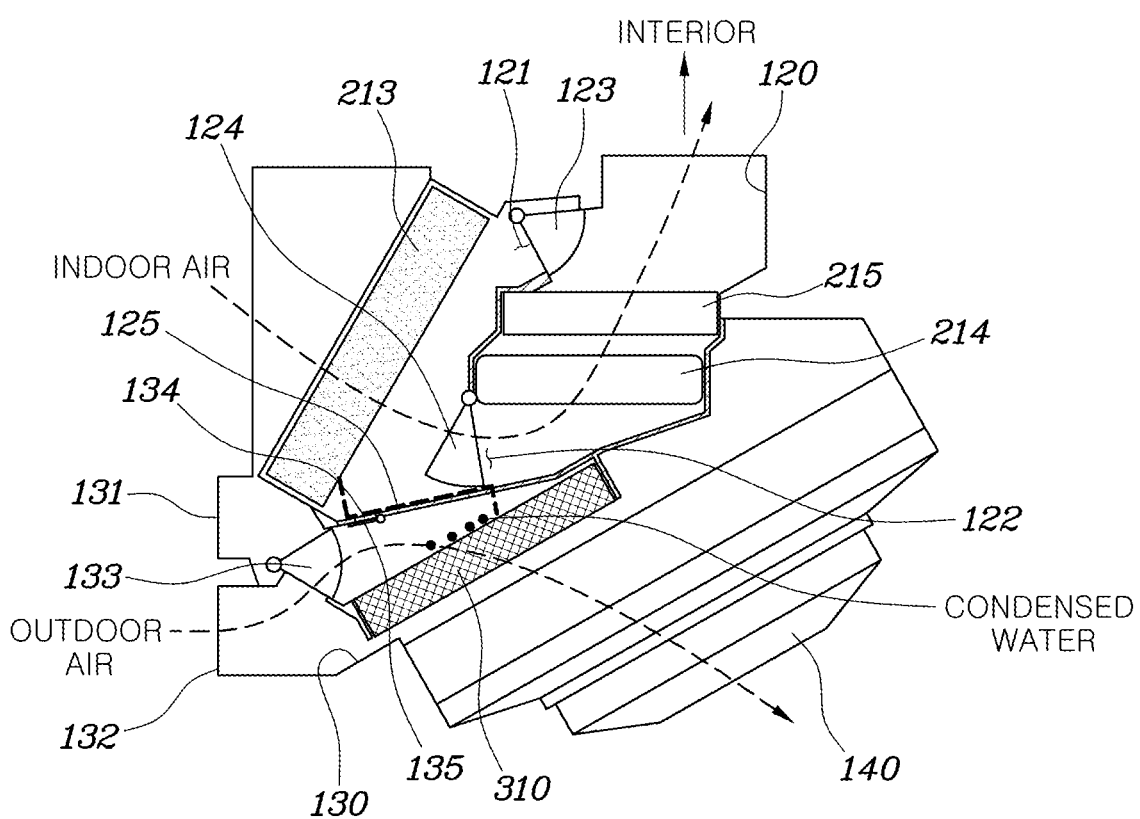
FIG. 5 is a view illustrating the cooling operation of the air conditioner apparatus for electric vehicles according to one form of the present disclosure.
Figure 6:
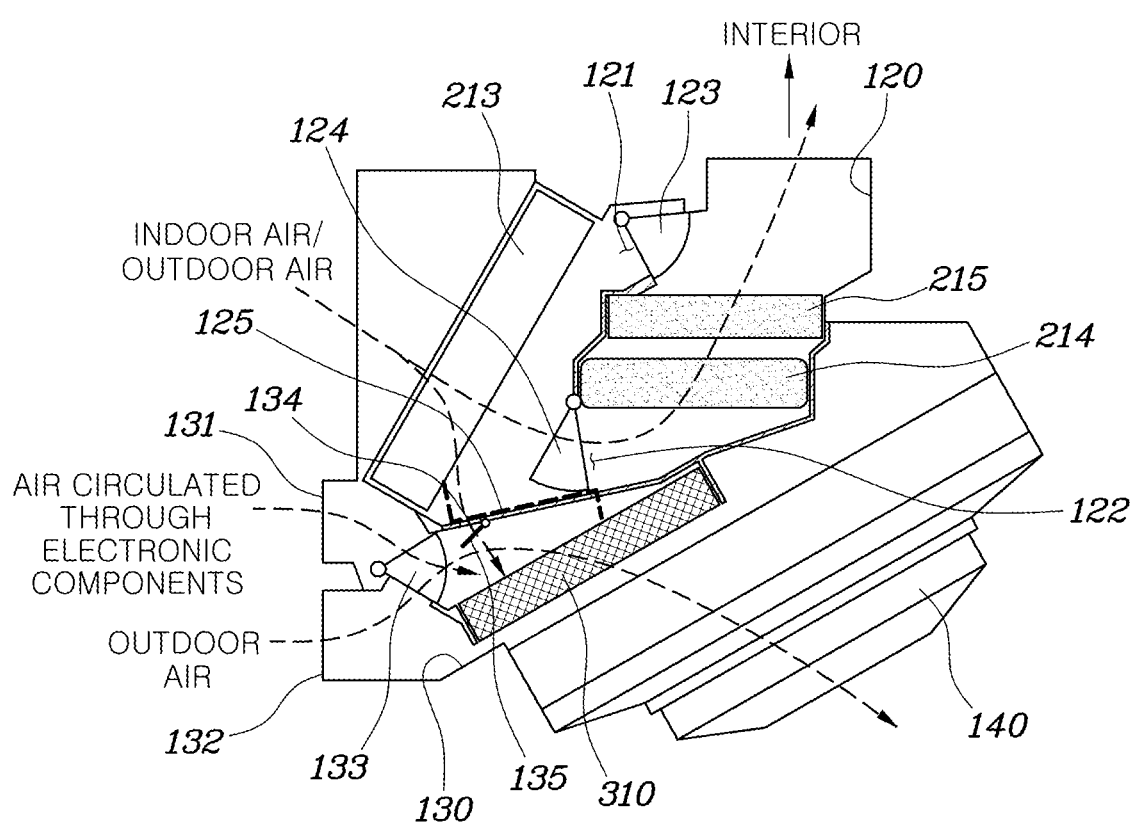
FIG. 6 is a view illustrating the heating operation of the air conditioner apparatus for electric vehicles according to one form of the present disclosure.
Figure 7:
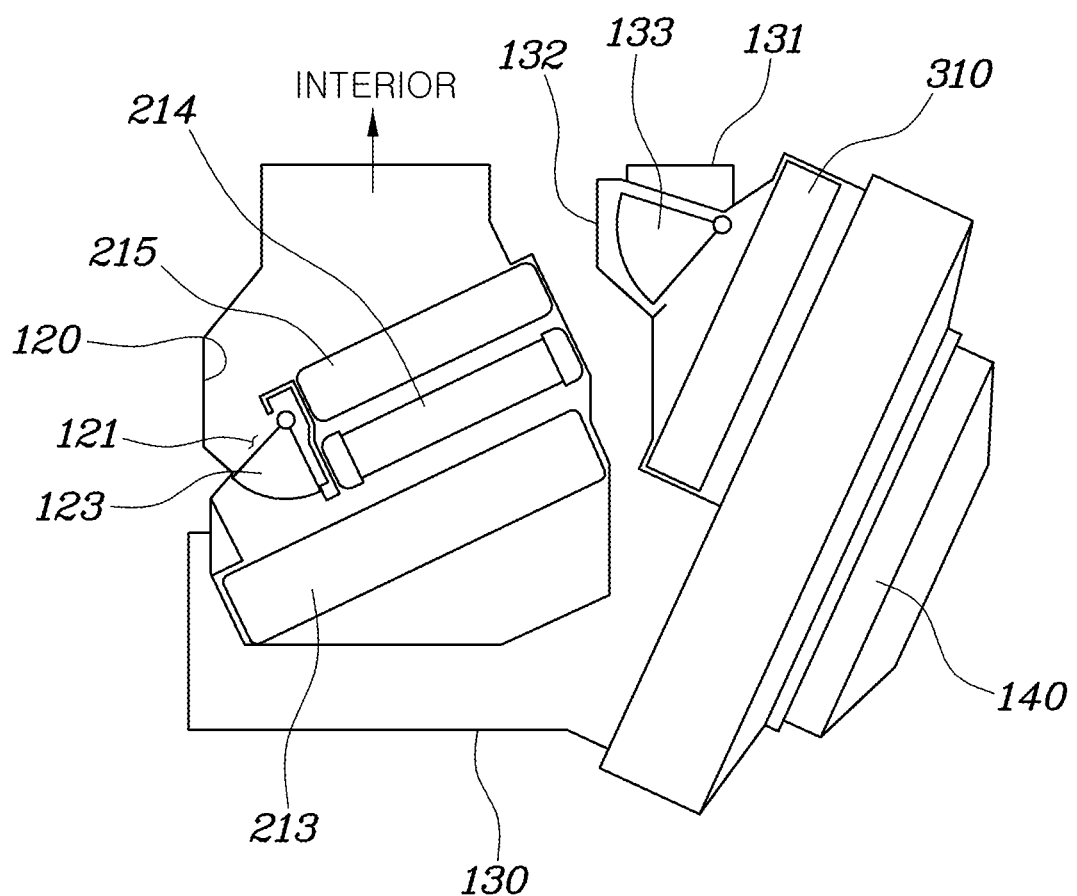
FIG. 7 is a view illustrating an air conditioner apparatus for electric vehicles according to another form of the present disclosure.
Figure 8:
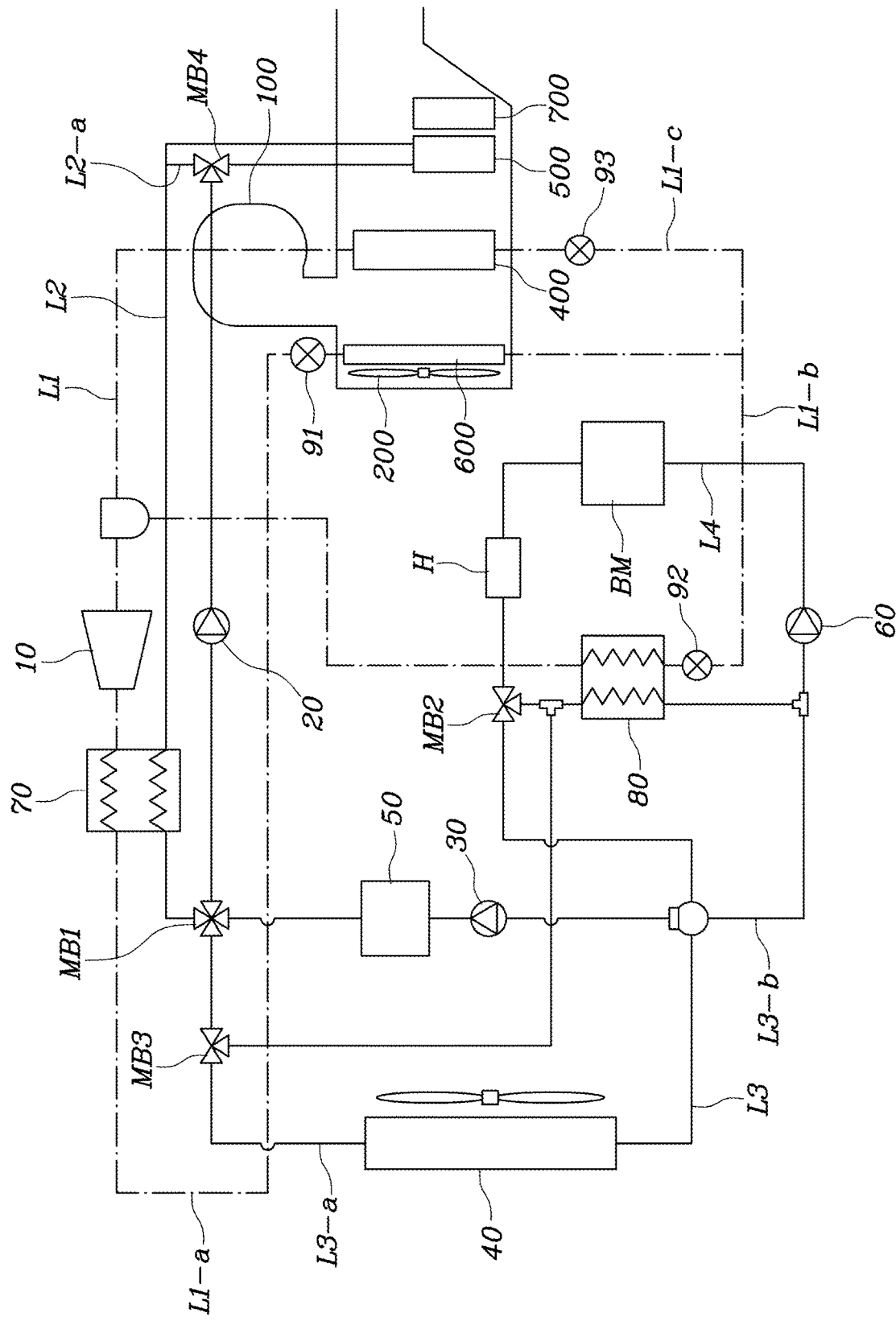
FIG. 8 is a circuit diagram of an air conditioning system for electric vehicles according to one form of the present disclosure.
Figure 9:
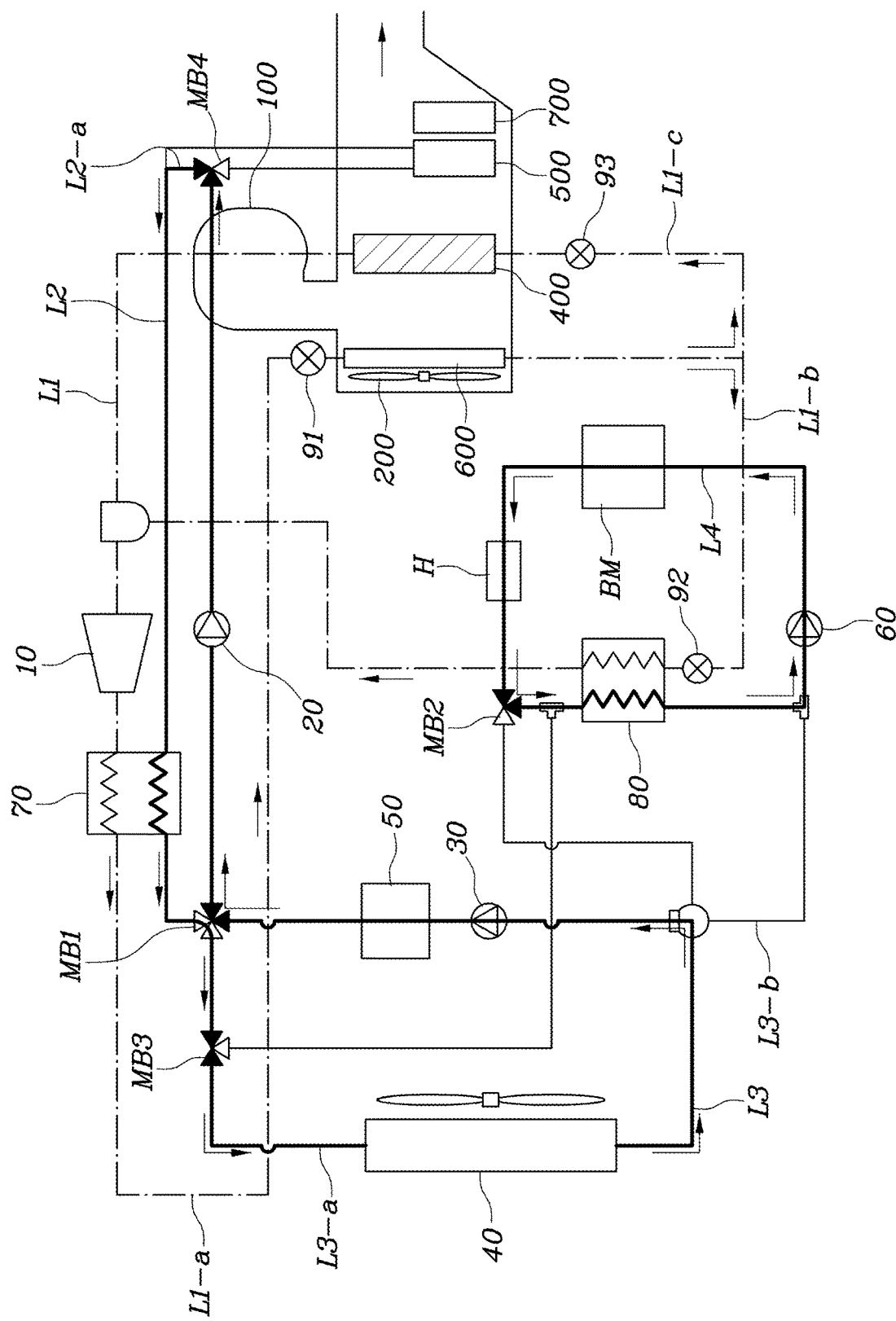
FIG. 9 is a circuit diagram illustrating the cooling operation of the air conditioning system for electric vehicles according to the present disclosure, shown in FIG. 8.
Figure 10:
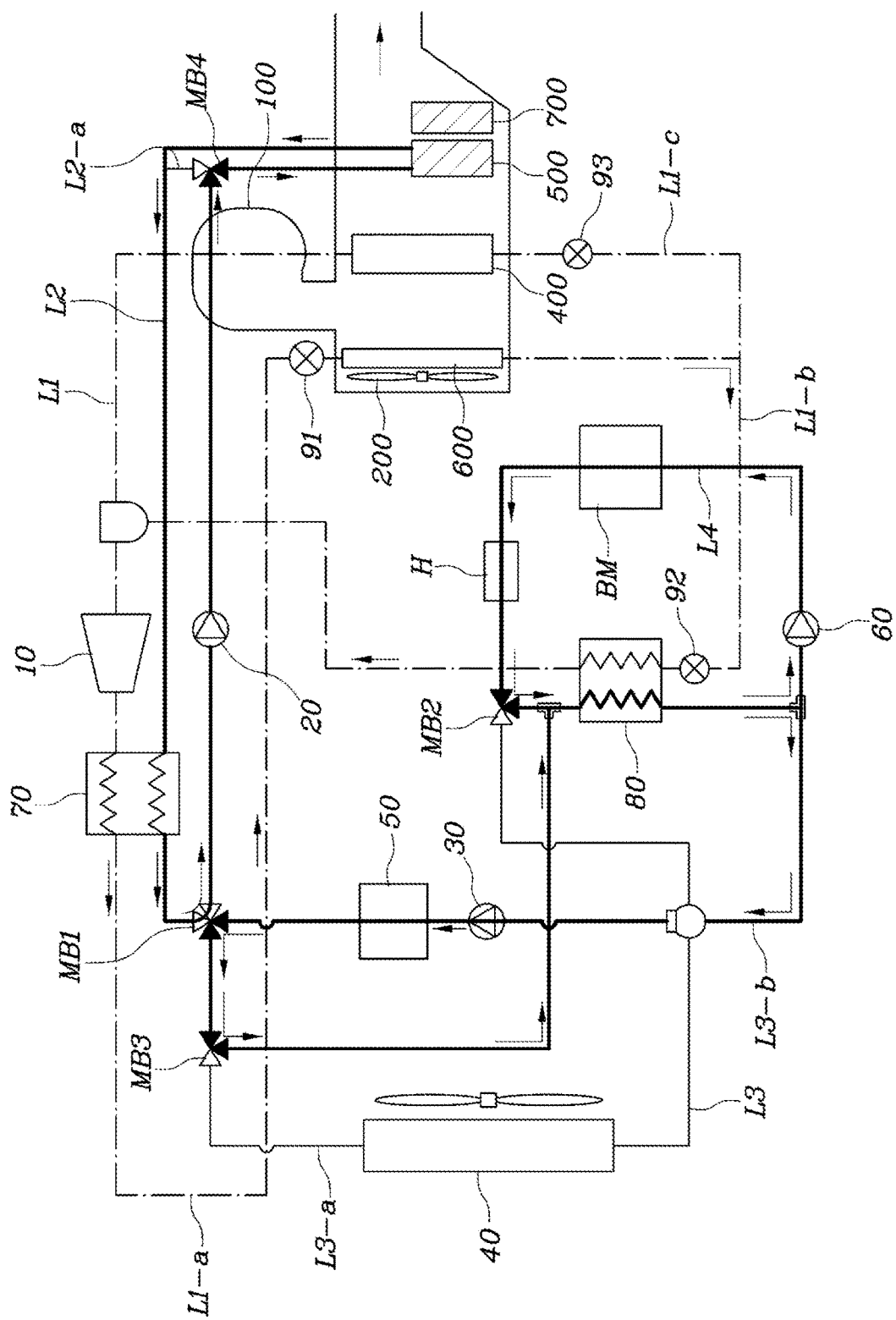
FIG. 10 is a circuit diagram illustrating the heating operation of the air conditioning system for electric vehicles according to the present disclosure, shown in FIG. 8.

FIG. 1 is a view illustrating application of an air conditioning case to an electric vehicle according to one form of the present disclosure, FIG. 2 is a view illustrating an air conditioning case of an air conditioner apparatus for electric vehicles according to one form of the present disclosure, FIG. 3 is a view illustrating a first region of the air conditioner apparatus for electric vehicles according to the present disclosure, shown in FIG. 2, FIG. 4 is a view illustrating a second region and a third region of the air conditioner apparatus for electric vehicles according to the present disclosure, shown in FIG. 2, FIG. 5 is a view illustrating the cooling operation of the air conditioner apparatus for electric vehicles according to the present disclosure, FIG. 6 is a view illustrating the heating operation of the air conditioner apparatus for electric vehicles according to the present disclosure, FIG. 7 is a view illustrating an air conditioner apparatus for electric vehicles according to another form of the present disclosure, FIG. 8 is a circuit diagram of an air conditioning system for electric vehicles according to the present disclosure, FIG. 9 is a circuit diagram illustrating the cooling operation of the air conditioning system for electric vehicles according to the present disclosure, shown in FIG. 8, and FIG. 10 is a circuit diagram illustrating the heating operation of the air conditioning system for electric vehicles according to the present disclosure, shown in FIG. 8.

The air conditioner apparatus for electric vehicles according to the present disclosure includes, as shown in FIGS. 1 to 3, an air conditioning case 100 installed under an under body U1 of a vehicle and configured such that the upper portion of the air conditioning case 100 is connected to the interior of the vehicle so as to circulate air, an HVAC module 200 provided inside the air conditioning case 100 and configured to adjust the temperatures of indoor air and outdoor air and to provide conditioned air to the interior of the vehicle, and a heat exchange module 300 provided below the HVAC module 200 inside the air conditioning case 100 and configured to exchange heat with the HVAC module 200 according to whether or not the HVAC module 200 performs a heating or cooling operation.

As such, the HVAC module 200, which forms heated air or cooled air, and the heat exchange module 300 are provided inside the air conditioning case 100, the HVAC module 200 forms heated air or cooled air and then provides the heated air or the cooled air to the interior of the vehicle, and the heat exchange module 300 provides heat pump efficiency during air-conditioning. The air conditioning case 100 is installed under the under body U1 of the vehicle, and the upper portion of the air conditioning case 100 is connected to the interior of the vehicle so that air conditioned by the HVAC module 200 may be provided to the interior of the vehicle. That is, because a futuristic vehicle should maximally provide an indoor space and require reduction of a space in which the air conditioner apparatus is installed, the air conditioning case 100 should be provided in the under body U1 of the vehicle. Particularly, the HVAC module 200 and the heat exchange module 300 are provided inside the air conditioning case 100, and refrigerant lines are shortened and the overall size of the air conditioner apparatus is reduced.

Here, the air conditioning case 100 is divided into a first region 110 configured such that indoor air and outdoor air are circulated thereinto, a second region 120 configured to receive the indoor air and the outdoor air supplied from the first region 110 and connected to the interior of the vehicle and provided with the HVAC module 200 therein, and a third region 130 configured such that air circulated through electronic components and outdoor air are circulated thereinto and provided with the heat exchange module 300 therein.

Further, a first blower 140 configured to simultaneously blow air to both the first region 110 and the third region 130 is provided in the air conditioning case 100. The HVAC module 200 includes an air conditioner 210 provided in the first region 110 so as to adjust the circulation amounts of the indoor air and the outdoor air, and an evaporator 213 and a heater 214 provided in the second region 120, and the heat exchange module 300 includes an indoor heat exchanger 310 configured to share a refrigerant circulated in the evaporator 213.

As such, the HVAC module 200 configured to form heated air or cooled air and the heat exchange module 300 are provided in the air conditioning case 100, and the respective elements forming the HVAC module 200 and the heat exchange module 300 are disposed in the first region 110, the second region 120 and the third region 130 in a distributed manner. The first region 110, the second region 120 and the third region 130 are divided by partitions in the air conditioning case 100, the first region 110 is configured such that indoor air and outdoor air is circulated therein, the second region 120 is configured such that cooled air or heated air is formed therein and then supplied to the interior of the vehicle, and the third region 130 is used as a space configured to provide the heat pump efficiency of an air conditioning module.

In the air conditioning case 100, the air conditioner 210 is provided in the first region 110, the evaporator 213 and the heater 214 are provided in the second region 120, and the indoor heat exchanger 310 is provided in the third region 130. Thereby, indoor air and outdoor air may be selectively adjusted and circulated in the first region 110 by the air conditioner 210, and the evaporator 213 or the heater 214 may be operated so as to form cooled/heated air according to whether or not cooling or heating is performed. Here, conditioned air in the second region 120 may be provided to the interior of the vehicle through an outlet 126 configured to communicate the under body U1 and an upper body U2 therethrough. Further, the indoor heat exchanger 310 in the third region 130 condenses or expands the refrigerant according to whether or not cooling or heating is performed, thereby providing heat pump efficiency. That is, the refrigerant is circulated in the evaporator 213 and the indoor heat exchanger 310, cooling water is circulated in the heater 214, and a heat pump may be implemented through heat exchange between the refrigerant and the cooling water. A heat pump system including a compressor 10, heat exchangers, and expansion units in addition to the evaporator 213, the indoor heat exchanger 310, and the heater 214 will be described below.

That is, in the present disclosure, when cooled air is provided to the interior of the vehicle, as shown in FIG. 5, indoor air flows into the first region 110 through the air conditioner 210, the indoor air is cooled by the evaporator 213 in the second region 120, and outdoor air is transmitted to the indoor heat exchanger 310 in the third region 130 by the first blower 140. As such, when cooling of the interior of the vehicle is performed, indoor air flows into the first region 110 through the air conditioner 210 in an indoor circulation mode, and cooled air is formed by the evaporator 213 in the second region 120 and is then supplied to the interior of the vehicle. Here, the indoor heat exchanger 310 condenses the refrigerant, and condensation efficiency is improved by the first blower 140 in the third region 130.

In contrast, when heated air is provided to the interior of the vehicle, as shown in FIG. 6, indoor air and outdoor air flow into the first region 110 through the air conditioner 210, the indoor air and the outdoor air are heated by the heater 214 in the second region 120, and outdoor air and air circulated through the electronic components are transmitted to the indoor heat exchanger 310 in the third region 130 by the first blower 140. As such, when heating of the interior of the vehicle is performed, indoor air and outdoor air flow into the first region 110 through the air conditioner 210, and heated air is formed by the heater 214 in the second region 120 and is then supplied to the interior of the vehicle. Here, the evaporator 213 performs no expansion of the refrigerant and thus does not form cooled air, and the indoor heat exchanger 310 expands the refrigerant and thus provides transmission of heat to the heater 214 through heat absorption.

As such, in the present disclosure, some elements of the HVAC module 200 and the heat exchange module 300 are provided inside the air conditioning case 100, and thus the overall size of the air conditioner apparatus is reduced and refrigerant lines are shortened. Further, the interior of the vehicle may be cooled or heated, and heating efficiency through the heat pump may be increased.

The present disclosure will be described in more detail below.

As shown in FIGS. 3 and 4, the air conditioning case 100 may be configured such that the first region 110 and the second region 120 are disposed laterally so as to be divided from each other, and the third region 130 is disposed under the second region 120 so as to be divided therefrom. Because the first region 110 and the second region 120 are disposed laterally in the air conditioning case 100, the movement path of air flow circulated from the first region 110 to the second region 120 may be shortened. Further, because the third region 130 is disposed under the second region 120, a distance between the indoor heat exchanger 310 and the evaporator 213 is decreased and a refrigerant line between the indoor heat exchanger 310 and the evaporator 213 is shortened. In addition, because the evaporator 213 in the second region 120 is located at a position higher than that of the indoor heat exchanger 310 in the third region 130, condensed water generated when cooled air is formed through the evaporator 213 is transmitted to the indoor heat exchanger 310 located below the evaporator 213, and thus, heat dissipation performance of the indoor heat exchanger 310 due to the condensed water is additionally provided.

An indoor air inlet 111 through which indoor air flows into the first region 110 and a first outdoor air inlet 112 through which outdoor air flows into the first region 110 are formed in the first region 110 of the air conditioning case 100, and the air conditioner 210 includes a first adjustment door 211 configured to adjust the circulation amounts of the indoor air and the outdoor air and a second blower 212 configured to circulate the indoor air and the outdoor air, having passed through the first adjustment door 211, into the second region 120. That is, in the first region 110, the indoor air inlet 111 is a part which communicates with the interior of the vehicle in a direction from the under body U1 to the upper body U2 so that air in the interior of the vehicle flows into the first region 110 through the indoor air inlet 111, and the first outdoor air inlet 112 is a part through which outdoor air flows into the first region 110. Here, the circulation amounts of indoor air and outdoor air through the indoor air inlet 111 and the first outdoor air inlet 112 are adjusted by the first adjustment door 211, and the indoor air and the outdoor air are circulated into the second region 120 by the operation of the second blower 212. A filter F configured to filter out impurities from the indoor air or the outdoor air may be further provided in the second blower 212.

In the second region 120, the evaporator 213 and the heater 214 are disposed in the circulation direction of air, and an electric heater 215 may be further provided behind the heater 214. That is, the indoor air and the outdoor air circulated through the first region 110 passes through the evaporator 213 and the heater 214 in the second region 120 and is circulated to the interior of the vehicle. Particularly, the electric heater 215 is further provided behind the heater 214, and thus, when heated air is provided to the interior of the vehicle, the electric heater 215 serves as another heat source in addition to the heater 214, thereby being capable of sufficiently providing heated air demanded by the interior of the vehicle. The electric heater 215 may include a PTC heater.

Here, the second region 120 is divided into a first circulation path 121 in which air transmitted from the first region 110 bypasses the heater 214 and the electric heater 215, and a second circulation path 122 in which air transmitted from the first region 110 passes through the heater 214 and the electric heater 215. Further, a second adjustment door 123 configured to adjust opening or closing of the first circulation path 121 and a third adjustment door 124 configured to adjust opening or closing of the second circulation path 122 are provided in the second region 120.

As such, the second region is divided into the first circulation path 121 and the second circulation path 122, the opening degree of the first circulation path 121 is adjusted by the second adjustment door 123, and the opening degree of the second circulation path 122 is adjusted by the third adjustment door 124. That is, the first circulation path 121 is used to provide an additional air volume when cooled air is provided to the interior of the vehicle, in more detail, to allow a portion of air having passed through the evaporator 213 to be circulated directly to the interior of the vehicle through the first circulation path 121, thereby being capable of providing cooled air. When the cooled air is provided to the interior of the vehicle in such a manner, the second adjustment door 123 may be opened.

The second circulation path 122 is used to allow air transmitted from the first region 110 to pass through the heater 214 and the electric heater 215, and the opening degree of the second circulation path 122 is selectively adjusted by the third adjustment door 124. Thereby, when cooled air is provided to the interior of the vehicle, the third adjustment door 124 is closed, and thus, all of cooled air having passed through the evaporator 213 may be circulated into the first circulation path 121 so as to provide an air volume. Further, when heated air is provided to the interior of the vehicle, the third adjustment door 124 opens the second circulation path 122, the second adjustment door 123 closes the first circulation path 121, and thus, air in the second region 120 may pass through the heater 214 and the electric heater 215. Any one of the second adjustment door 123 and the third adjustment door 124 may be selectively applied, or both thereof may be applied.

A PE room inlet 131 through which air circulated through the electronic components flows into the third region 130 and a second outdoor air inlet 132 through which outdoor air flows into the third region 130 may be formed in the third region 130 of the air conditioning case 100, and a fourth adjustment door 133 configured to adjust the opening degrees of the PE room inlet 131 and the second outdoor air inlet 132 may be provided in the third region 130.

That is, in the third region 130, the PE room inlet 131 is a part through which air heated by the various electronic components flows into the third region 130, and the second outdoor air inlet 132 is a part through which outdoor air flows into the third region 130. Here, the circulation amounts of the air circulated through the electronic components and the outdoor air through the PE room inlet 131 and the second outdoor air inlet 132 may be adjusted by the fourth adjustment door 133, and be circulated by the first blower 140. As such, the heated air circulated through the electronic components is circulated through the PE room inlet 131, and thus, when the interior of the vehicle is heated, the heated air circulated through the electronic components may be supplied to the indoor heat exchanger 310 and heat absorption of the indoor heat exchanger 310 may be increased. Therefore, the heating performance of the heater 214 due to the heat pump system is improved.

An opening 134, through which the second region 120 and the third region 130 communicate with each other so as to circulate air from the second region 120 to the third region 130, may be formed through the air conditioning case 100, and a fifth adjustment door 135 configured to adjust opening or closing of the opening 134 may be provided at the opening 134. The opening 134 may be formed at a position where air circulated through the second region 120 may be circulated towards the indoor heat exchanger 310 in the third region 130, and the opening degree of the opening 134 may be adjusted by the fifth adjustment door 135. Thereby, when the interior of the vehicle is heated, warm air in the interior of the vehicle is circulated towards the indoor heat exchanger 310 through the opening 134 by opening the fifth adjustment door 135, and thus, heat absorption of the indoor heat exchanger 310 is increased. Therefore, the heating performance of the heater 214 due to the heat pump system is improved.

A guide path 125 configured to collect condensed water generated by the evaporator 213 and to supply the condensed water to the indoor heat exchanger 310 may be provided in the air conditioning case 100. In the present disclosure, because the third region 130 is provided under the second region 120, the evaporator 213 is disposed above the indoor heat exchanger 310. Thereby, the condensed water generated by the evaporator 213 may be moved to the indoor heat exchanger 310 provided below the indoor heat exchanger 310. In addition, because the guide path 125 is provided below the evaporator 213 in the second region 120, the condensed water generated by the evaporator 213 may be moved to the indoor heat exchanger 310 by the guide path 125. The guide path 125 may be extended into a pipe type. Therefore, the condensed water generated when cooled air is formed by the evaporator 213 is transmitted to the indoor heat exchanger 310, and thereby, the heat dissipation performance of the indoor heat exchanger 310 due to the condensed water may be additionally provided.

Further, as shown in FIG. 7, the air conditioning case 100 may be configured such that the first region 110 and the second region 120 are disposed laterally so as to be divided from each other, and the third region 130 is disposed in front of or behind the second region 120 so as to be divided therefrom. Because the first region 110 and the second region 120 are disposed laterally in the air conditioning case 100, the movement path of air flow circulated from the first region 110 to the second region 120 may be shortened. Further, because the third region 130 is disposed in front of or behind the second region 120, a distance between the indoor heat exchanger 310 and the evaporator 213 is decreased and a refrigerant line between the indoor heat exchanger 310 and the evaporator 213 is shortened. In addition, outdoor air circulated into the first region 110 and the third region 130 may smoothly flow due to the first blower 140 provided in the air conditioning case 100.

The disposition of the first region 110, the second region 120 and the third region 130 of the air conditioning case 100 shown in FIG. 3 and the disposition of the first region 110, the second region 120 and the third region 130 of the air conditioning case 100 shown in FIG. 7 may be selectively applied.

Further, the air conditioning system for electric vehicles according to the present disclosure includes, as shown in FIG. 8, a refrigerant line L1 configured to circulate a refrigerant therealong and to have a compressor 10, an indoor heat exchanger 310, expansion units and an evaporator 213 provided thereon, a heating line L2 configured to circulate cooling water therealong and to have a first water pump 20 and a heater 214 provided thereon, an electronic component line L3 configured to circulate the cooling water therealong and to have a second water pump 30, an outdoor heat exchanger 40 and a PE module 50 provided thereon, a battery line L4 configured to circulate the cooling water therealong and to have a third water pump 60 and a battery module BM provided thereon, a first heat exchanger 70 connected to the refrigerant line L1 and the heating line L2 so as to exchange heat between the refrigerant in the refrigerant line L1 and the cooling water in the heating line L2, and a second heat exchanger 80 connected to the electronic component line L3 and the battery line L4 so as to exchange heat between the cooling water in the electronic component line L3 and the cooling water in the battery line L4.

That is, the compressor 10, the indoor heat exchanger 310, the expansion units and the evaporator 213 are provided on the refrigerant line L1 so that air conditioning is performed through refrigerant circulation, and the cooling water is circulated through the heating line L2, the electronic component line L3 and the battery line L4, thereby implementing the heat pump through cooling and heat exchange among the various electronic components. A water heating-type heater H may be further provided on the battery line L4 in order to adjust the temperature of the battery module BM.

Here, the compressor 10 compresses the refrigerant and discharges the compressed refrigerant so as to circulate the refrigerant along the refrigerant line L1, and the expansion unit expands the refrigerant or is opened to pass the refrigerant thereby or closed to block the refrigerant depending on whether or not cooling or heating of the interior of vehicle is performed.

The first water pump 20, the second water pump 30 and the third water pump 60 serve to circulate the cooling water to the heating line L2, the electronic component line L3 and the battery line L4, respectively.

The outdoor heat exchanger 40 may be disposed outdoors, and perform temperature adjustment by cooling the cooling water through rotation of a radiator fan.

Thereby, the PE module 50 and the battery module BM may be cooled by the cooling water.

The first heat exchanger 70 is connected to the refrigerant line L1 and the heating line L2 so as to exchange heat between the refrigerant circulated along the refrigerant line L1 and the cooling water circulated along the heating line L2.

The second heat exchanger 80 is connected to the electronic component line L3 and the battery line L4 so as to exchange heat between the cooling water circulated along the electronic component line L3 and the cooling water circulated along the battery line L4.

Therefore, in the present disclosure heat exchange between the refrigerant and/or the cooling water circulated along the corresponding lines is performed, thereby being capable of implementing the heat pump.

In more detail, the refrigerant line L1 may include a first refrigerant line L1-a configured to start from the compressor 10 and to be connected to the indoor heat exchanger 310 via the first heat exchanger 70 and a first expansion unit 91, a second refrigerant line L1-b configured to start from the indoor heat exchanger 310 and to be connected to the compressor 10 via a second expansion unit 92 and the second heat exchanger 80, and a third refrigerant line L1-c configured to branch off from the second refrigerant line L1-b and to be connected to the compressor 10 via a third expansion unit 93 and the evaporator 213. Thereby, the refrigerant in the first refrigerant line L1-a exchanges heat with the cooling water in the heating line L2 through the first heat exchanger 70, or the refrigerant in the second refrigerant line L1-b exchanges heat with the cooling water in the battery line L4 through the second heat exchanger 80. Further, the evaporator 213 may evaporate the refrigerant or inhibit the refrigerant from being circulated according to the opening state of the third expansion unit 93.

The heating line L2 and the electronic component line L3 may be connected by a first multi-way valve MB1, and the electronic component line L3 and the battery line L4 may be connected by a second multi-way valve MB2. That is, the heating line L2 and the electronic component line L3 share the cooling water through the first multi-way valve MB1, and a circulation path of the cooling water is determined thereby. Further, the electronic component line L3 and the battery line L4 share the cooling water through the second multi-way valve MB2, and a circulation path of the cooling water is determined thereby. The first multi-way valve MB1 and the second multi-way valve MB2 may employ a 3-way valve or a 4-way valve depending on the design of each circuit.

The electronic component line L3 may include a first electronic component line L3-a configured to start from the first multi-way valve MB1 and to return to the first multi-way valve MB1 via the outdoor heat exchanger 40, the second water pump 30 and the PE module 50, and a second electronic component line L3-b configured to branch off from the first electronic component line L3-a and to return to the first electronic component line L3-a via the second heat exchanger 80, and a third multi-way valve MB3 may be provided at a point at which the second electronic component line L3-b branches off from the first electronic component line L3-a. As such, the electronic component line L3 is divided into the first electronic component line L3-a and the second electronic component line L3-b, and the second electronic component line L3-b exchanges heat with the battery line L4 through the second heat exchanger 80, and thus, heat pump efficiency may be improved using waste heat of the PE module 50 or the battery module BM when the interior of the vehicle is heated.

Further, a bypass line L2-a may branch off from the heating line L2 in front of the heater 214, and a fourth multi-way valve MB4 may be provided on the bypass line L2-a. The cooling water circulated along the heating line L2 may not be supplied to the heater 214, and may instead be circulated through the bypass line L2-2. The circulation of the cooling water through the bypass line L2-a is adjusted by the fourth multi-way valve MB4.

Hereinafter, the operation of the air conditioning system for electric vehicles at the time of cooling or heating the interior of the vehicle will be described.

As shown in FIG. 9, when the interior of the vehicle is cooled, the refrigerant passes through the first heat exchanger 70 and the indoor heat exchanger 310 due to the driving of the compressor 10. Here, the first heat exchanger 70 exchanges heat with the cooling water circulated along the heating line L2 and the indoor heat exchanger 310 emits heat through the first blower 140, and thereby, the first heat exchanger 70 and the indoor heat exchanger 310 condense the cooling water. Here, the first expansion unit 91 is opened so that the refrigerant bypasses the first expansion unit 91, and the second expansion unit 92 and the third expansion unit 93 expand the refrigerant. Thereby, the temperature of the refrigerant expanded by the second expansion unit 92 in the second refrigerant line L1-b may be lowered, and the temperature of the cooling water in the battery line L4 may be lowered through heat exchange between the refrigerant having the lowered temperature and the cooling water in the battery line L4 via the second heat exchanger 80. Further, the refrigerant expanded by the third expansion unit 93 in the third refrigerant line L1-c may be moved to the evaporator 213, and cooled air may be formed through evaporation of the refrigerant by the evaporator 213. The cooling water is circulated along only the battery line L4 through adjustment of the second multi-way valve MB2, and the cooling water cooled by the outdoor heat exchanger 40 passes through the second water pump 30, the PE module 50, the third water pump 60 and the first heat exchanger 70 and then returns to the outdoor heat exchanger 40 through adjustment of the first multi-way valve MB1, the third multi-way valve MB3 and the fourth multi-way valve MB4.

Thereby, cooled air may be provided to the interior of the vehicle, the battery module BM may be cooled, and the PE module 50 may be cooled through heat exchange by the outdoor heat exchanger 40.

In contrast, as shown in FIG. 10, when the interior of the vehicle is heated, the refrigerant is transmitted to the first heat exchanger 70 due to the driving of the compressor 10. Thereby, the cooling water in the heating line L2 connected to the first heat exchanger 70 is heated by the heat transmitted from the high-temperature refrigerant, and the heated cooling water is transmitted to the heater 214 through adjustment of the fourth multi-way valve MB4. Here, the first multi-way valve MB1 allows the cooling water circulated along the heating line L2 to be circulated along only the heating line L2 and thus inhibits lowering of the heating efficiency of the heater 214. As such, the heater 214 heats surrounding air and may thus generate heated air. The first expansion unit 91 expands the refrigerant, and the indoor heat exchanger 310 evaporates the refrigerant so as to absorb heat therearound. Here, air circulated through the electronic components and indoor air are transmitted to the indoor heat exchanger 310, and thus, air absorption of the indoor heat exchanger 310 is improved. The second expansion unit 92 is opened so that the refrigerant bypasses the second expansion unit 92, and the refrigerant circulated along the second refrigerant line L2-*b* exchanges heat with the cooling water in the battery line L4 via the second heat exchanger 80. Here, the cooling water is circulated through the PE module 50 and the battery module BM in the electronic component line L3 and the battery line L4 so that the temperature of the cooling water is raised, and the cooling water having the raised temperature exchanges heat with the second heat exchanger 80, through adjustment of the first multi-way valve MB1, the second multi-way valve MB2 and the third multi-way valve MB3. That is, waste heat of the PE module 50 and the battery module BM is recovered and transmitted to the refrigerant by the second heat exchanger 80, and thus, the temperature of the refrigerant is raised. Thereby, the compressor 10 receives the refrigerant having the raised temperature and then compresses the refrigerant so that the temperature of the refrigerant is additionally raised, the high-temperature refrigerant raises the temperature of the cooling water in the heating line L2 through the first heat exchanger 70, and thus, heating efficiency of the heater 214 is improved.

As such, in the present disclosure, the HVAC system is integrated with the cooling region of the air conditioning system in the air conditioning case 100, thereby being capable of shortening refrigerant flow paths, and providing cooling and heating performance using the heat pump.

As is apparent from the above description, an air conditioner apparatus for electric vehicles and an air conditioning system for electric vehicles using the same according to the present disclosure integrate an HVAC system with a cooling region of an air conditioning system, thereby shortening refrigerant flow paths, and providing cooling and heating performance using a heat pump.

Although the preferred forms of the present disclosure have been disclosed for illustrative purposes, those skilled in the art will appreciate that various modifications, additions and substitutions are possible, without departing from the scope and spirit of the disclosure.

What is claimed is:

1. An air conditioner apparatus for an electric vehicle, the air conditioner apparatus comprising:
   an air conditioning case installed under an under body of the electric vehicle, and configured to communicate with an interior of the electric vehicle through an outlet formed through an upper portion of the air conditioning case and circulate conditioned air therein;
   a heating, ventilation, and air conditioning (HVAC) module provided inside the air conditioning case, and configured to adjust a temperatures of indoor air and outdoor air and to provide the conditioned air to the interior of the electric vehicle; and
   a heat exchange module provided below the HVAC module inside the air conditioning case and configured to exchange heat with the HVAC module based on whether or not the HVAC module performs a heating or cooling operation,
   wherein the air conditioning case comprises:
      a first region configured to allow the indoor air and the outdoor air to circulate thereinto;
      a second region connected to the interior of the electric vehicle, and configured to receive the indoor air and the outdoor air supplied from the first region; and
      a third region having the heat exchange module therein, and configured to allow air to circulate through electronic components and allow the outdoor air to circulate thereinto, and
   wherein:
      the air conditioning case comprises a first blower configured to simultaneously blow air to both the first region and the third region;
      the HVAC module comprises an air conditioner provided in the first region and configured to adjust circulation amounts of the indoor air and the outdoor air, and an evaporator and a heater provided in the second region; and
      the heat exchange module comprises an indoor heat exchanger configured to share a refrigerant circulated in the evaporator.

2. The air conditioner apparatus according to claim 1, wherein, when cooled air is provided to the interior of the electric vehicle,
   the air conditioner is configured to allow the indoor air flow into the first region,
   the evaporator is configured to cool the indoor air in the second region, and
   the first blower is configured to transmit outdoor air to the indoor heat exchanger in the third region.

3. The air conditioner apparatus according to claim 1, wherein, when heated air is provided to the interior of the electric vehicle,
   the indoor air and the outdoor air flow into the first region through the air conditioner and are heated by the heater in the second region, and
   the outdoor air and the air circulated through the electronic components are transmitted to the indoor heat exchanger in the third region by the first blower.

4. The air conditioner apparatus according to claim 1, wherein the first region and the second region are disposed laterally and are divided from each other, and
   the third region is disposed under the second region and is divided from the second region.

5. The air conditioner apparatus according to claim 1, further comprising:
   a first adjustment door configured to adjust the circulation amounts of the indoor air and the outdoor air; and
   a second blower configured to circulate the indoor air and the outdoor air, having passed through the first adjustment door, into the second region,
   wherein the first region includes:
      an indoor air inlet configured to allow the indoor air to flow into the first region; and
      a first outdoor air inlet configured to allow the outdoor air to flow into the first region.

6. The air conditioner apparatus according to claim 1, further comprising:
   an electric heater behind the heater in the second region,
   wherein the evaporator and the heater are disposed in a circulation direction of air.

7. The air conditioner apparatus according to claim 1, wherein the second region comprises:
   a first circulation path configured to allow air transmitted from the first region to bypass the heater and an electric heater; and
   a second circulation path configured to allow the air transmitted from the first region to pass through the heater and the electric heater.

8. The air conditioner apparatus according to claim 7, wherein the second region includes a second adjustment door configured to adjust opening or closing of the first circulation path.

9. The air conditioner apparatus according to claim 7, wherein the second region includes a third adjustment door configured to adjust opening or closing of the second circulation path.

10. The air conditioner apparatus according to claim 1, wherein the third region comprises:
   a powertrain electronics (PE) room inlet configured to allow the air circulated through the electronic components to flow into the third region;
   a second outdoor air inlet provided in the third region and configured to allow the outdoor air to flow into the third region; and
   a fourth adjustment door configured to adjust opening degrees of the PE room inlet.

11. The air conditioner apparatus according to claim 1, further comprising:
   an opening formed through the air conditioning case, and configured to allow the second region and the third region to communicate with each other and to circulate air from the second region into the third region; and
   a fifth adjustment door provided at the opening and configured to adjust opening or closing of the opening.

12. The air conditioner apparatus according to claim 1, further comprising:
   a guide path configured to collect condensed water generated by the evaporator and supply the condensed water to the indoor heat exchanger in the air conditioning case.

13. The air conditioner apparatus according to claim 1, wherein the first region and the second region are disposed laterally and are divided from each other, and
   the third region is disposed in front of or behind the second region and divided from the second region.

14. An air conditioning system for an electric vehicle, the air conditioning system comprising:
   an air conditioner including:
      an air conditioning case installed under an under body of the electric vehicle, and configured to communicate with an interior of the electric vehicle through an outlet formed through an upper portion of the air conditioning case and circulate conditioned air therein;
      a heating, ventilation, and air conditioning (HVAC) module provided inside the air conditioning case, and configured to adjust temperatures of indoor air and outdoor air and to provide the conditioned air to the interior of the electric vehicle; and
      a heat exchange module provided below the HVAC module inside the air conditioning case and configured to exchange heat with the HVAC module depending on whether or not the HVAC module performs a heating or cooling operation;
   a refrigerant line configured to circulate a refrigerant therealong and to have a compressor, an indoor heat exchanger of the heat exchange module, expansion units and an evaporator of the HVAC module thereon;
   a heating line configured to circulate cooling water therealong and to have a first water pump and a heater of the HVAC module thereon;
   an electronic component line configured to circulate the cooling water therealong and to have a second water pump, an outdoor heat exchanger and a powertrain electronics (PE) module thereon;
   a battery line configured to circulate the cooling water therealong and to have a third water pump and a battery module thereon;
   a first heat exchanger connected to the refrigerant line and the heating line, and configured to exchange heat between the refrigerant in the refrigerant line and the cooling water in the heating line; and
   a second heat exchanger connected to the electronic component line and the battery line, and configured to exchange heat between the cooling water in the electronic component line and the cooling water in the battery line.

15. The air conditioning system according to claim 14, wherein the refrigerant line comprises:
   a first refrigerant line configured to start from the compressor and to be connected to the indoor heat exchanger via the first heat exchanger and a first expansion unit;
   a second refrigerant line configured to start from the indoor heat exchanger and to be connected to the compressor via a second expansion unit and the second heat exchanger; and
   a third refrigerant line configured to branch off from the second refrigerant line and to be connected to the compressor via a third expansion unit and the evaporator.

16. The air conditioning system according to claim 14, further comprising:
   a first multi-way valve configured to connect the heating line and the electronic component line; and
   a second multi-way valve configured to connect the electronic component line and the battery line.

17. The air conditioning system according to claim 16, wherein the electronic component line comprises:
   a first electronic component line configured to start from the first multi-way valve and to return to the first multi-way valve via the outdoor heat exchanger, the second water pump and the PE module;
   a second electronic component line configured to branch off from the first electronic component line and to return to the first electronic component line via the second heat exchanger; and
   a third multi-way valve provided at a point at which the second electronic component line branches off from the first electronic component line.

18. The air conditioning system according to claim 14, further comprising:
   a bypass line configured to branch off from the heating line in front of the heater; and
   a fourth multi-way valve provided on the bypass line.

* * * * *